United States Patent [19]
Flynn et al.

[11] Patent Number: 5,493,582
[45] Date of Patent: Feb. 20, 1996

[54] METHOD AND APPARATUS FOR ENCODING AND DECODING AUTOMATIC RADIO IDENTIFICATION DATA

[75] Inventors: James M. Flynn, Raleigh, N.C.; Bruno Yurman, Lynchburg, Va.

[73] Assignee: Ericsson GE Mobile Communications, Research Triangle Park, N.C.

[21] Appl. No.: 191,542

[22] Filed: Feb. 4, 1994

[51] Int. Cl.$^6$ ............................. H04B 1/38; H04G 7/00
[52] U.S. Cl. ............................. 375/219; 455/35.1
[58] Field of Search ..................... 379/58, 59; 375/56; 455/35.1, 36.1, 37.1, 38.1; 340/825.07, 825.08

[56] References Cited

U.S. PATENT DOCUMENTS 5,023,936  6/1991  Seczutkowski et al. ............... 455/90
5,046,126  9/1991  Ingram ................................. 455/35

OTHER PUBLICATIONS

"Star Signaling: An Industry Pioneer", Mobile Radio Technology, Brad Bailey, Jul. 1992.

*Primary Examiner*—Stephen Chin
*Assistant Examiner*—Kevin Kim
*Attorney, Agent, or Firm*—Nixon & Vanderhye

[57] ABSTRACT

A radio communications system includes plural radios with each radio having a microprocessor, a modem, and corresponding automatic number identification (ANI) information as well as a predetermined pattern of tones or digital codes corresponding to a particular radio frequency channel stored in memory. For each transmission, the radio microprocessor encodes the corresponding radio identification data that provides the encoded radio identification data to the radio modem in parallel format. The radio modem converts the encoded identification data into a serial data stream at the same time that the microprocessor is generating the predetermined pattern of tones or digital codes. Thereafter, the generated pattern of tones or digital codes is combined with the serial data stream and simultaneously transmitted over the transmission radio frequency channel. The modem also assists the microprocessor in the reception of radio identification data while the microprocessor is detecting received channel guard information. Because the modem has a data transmission frequency which exceeds the transmission frequency of the ANI data, each bit of ANI data is represented using a particular binary pattern (or its complement) to simulate an output at the modem corresponding to an ANI signalling carrier frequency.

21 Claims, 10 Drawing Sheets

METHOD AND APPARATUS FOR ENCODING AND DECODING AUTOMATIC RADIO IDENTIFICATION DATA

BACKGROUND AND SUMMARY OF THE INVENTION

The present invention relates to a method and apparatus for generating radio identification information, and more particularly, to encoding and decoding such information using a single inexpensive microprocessor and a modem.

In conventional land mobile radio (LMR) systems, multiple radio transceivers, including for example portable radio units and mobile radio units, initiate and carry on communications over a preselected rf communications channel typically via a base station repeater. Land mobile radios find particular application with police and fire departments, municipalities, and other mobile groups that require immediate communication with other members of their respective group.

FIG. 1 illustrates in block diagram format a typical LMR system. A radio operator transmits a message from sending transceiver 10a to receiving transceiver 10b over a preassigned radio frequency channel. Typically, the radio transceivers 10a and 10b are out of range given the rf transceiving frequency, i.e. on the order of 800 MHz, and therefore require a base station repeater 12 to receive via antenna 14, combiner 16 and receiver 18 the rf transmission from sending transceiver 10a and "repeat" or retransmit the message at a relatively high power via transmitter 20, combiner 16, and antenna 14 for reception by receiving transceiver 10b. The transmit and receive circuits 18 and 20 are controlled by conventional digital and audio processing circuitry 22. A dispatcher at console 24 monitors and participates in radio unit communications. The console 24 includes a display 26, keyboard 28, speaker 30, and microphone 32 via a hardwire link to the base station 12.

In addition to transmitting audio information over a preassigned radio frequency, each radio also transmits at the same time a "channel guard" signal in the form of a low frequency tone pattern or a cyclically repeated digital code pattern. Such a "channel guard" is also referred to as a continuous tone coded squelch system (CTCSS) or a continuous digital coded squelch system (CSCSS). For simplicity and consistency, the term channel guard is used throughout the description and includes CTCSS and CDCSS. The channel guard signal allows an operator to selectively call desired parties and is also used to assign radios programmed on the same communications frequency (e.g. police officers at a local police station) to different groups. Each group of radios is therefore selectively programmed with a particular communications frequency and channel guard frequency tone or digital code pattern.

By using the channel guard option, many users can share a repeater system with specific transceivers being programmed to receive a particular channel guard patterns. The transmitted tones in a tone channel guard system may, for example, range from 67 Hz to 210.7 Hz in 0.1 Hz steps. In a digital channel guard system, there may be over 80 standard digital codes. The frequency of transmitted digital channel guard signals is typically lower than in tone channel guard systems.

Every communication transmitted from a radio unit must be accompanied by a simultaneously transmitted channel guard tone or digital code. Listening radios detect and decode communications on its programmed frequency along with accompanying channel guard signalling, and if the transmitted channel guard signal matches the listening radio's programmed channel guard tone/code, the radio unmutes the radio speaker so the operator may participate in the call. If the channel guard signal does not match the programmed channel guard tone/code, the speaker is muted and the operator does not participate in the received call. If during a communication, a receiving radio (or repeater) no longer detects a channel guard signal, the radio (repeater) terminates the communication. Accordingly, the channel guard signal must be continuously generated and detected in order to establish and conduct a communication.

In addition to generating the channel guard signal when the radio "keys" up a new transmission, each radio also generates it own radio identification number as an initial message every time an operator depresses the push-to-talk (PTT) button to communicate. A conventional messaging format for this radio identification information is the Status Reporting or STAR identifier protocol developed in the 1970's and used in General Electric portable radios. STAR is a digital signalling technique that generates automatic number identification (ANI) information unique to each radio whenever the radio's PTT button is depressed. Thus, preceding each voice transmission (and optionally during and/or at the end of each voice transmission) the digital ANI information is transmitted. Each data burst of ANI information includes a preamble, sync and data bits, the radio's identification number, a message indicating whether the communication is an emergency, and error control codes. For purposes of this description, the term ANI information or ANI signalling is used for simplicity and consistency and includes STAR and GESTAR™ signalling formats.

By decoding the ANI information transmitted by a radio, a receiving party such as a central radio dispatcher or another radio is informed of the identity of the radio and whether the communication is an emergency. Thus, the central radio dispatcher immediately knows from the ANI digital signalling if, for example, a police officer sending the message is in trouble (i.e. if an emergency message is included in the ANI information) and the identity of the radio (hence the specific police officer in trouble) before and without the need for the police officer to communicate that information over the voice channel. This is obviously an important feature in many LMR applications.

The simultaneous generation of ANI and channel guard signalling is an important but burdensome data processing task for each radio unit. This is particularly the case in lower-end, conventional radios that employ inexpensive, relatively slow microprocessors. As a result, for a radio to simultaneously generate both ANI and channel guard signals, two such microprocessors are used with one microprocessor dedicated to generating channel guard signals and the other to generating the ANI information. This extra hardware is not a serious problem in the base station repeater (which detects and regenerates these channel guard and ANI signals along with the transmitted voice) where size and cost are less of an issue compared with individual mobile/portable radios. In these radio units, however, it would be desirable reduce the radio size and cost by eliminating one of the microprocessors while still permitting the radio to these two important overhead processing tasks. It would also be advantageous for a radio unit to be able to receive and decode ANI and channel guard information using the same single microprocessors.

The present invention accomplishes these objectives (and others) by taking advantage of a modem built-in to most mobile/portable modem radios. These modem radios are usually manufactured with a uniform set of identical hardware and then subsequently programmed to operate in one or more different operational modes sometimes referred to as "systems." For example, a subscriber may desire a radio that operates in a conventional mode/system as well as a in a trunked mode/system, e.g., single site trunking, multi-site trunking, etc. Since modem radios are outfitted with a standard modem for data communications, (even if they are not actually activated for use in conventional radios), the present invention uses this existing modem under the control of a single inexpensive microprocessor to assist in the transmission and reception of ANI information. In this way, a single, inexpensive microprocessor is able to transmit, receive, and process both ANI and channel guard signals.

A radio communication system services plural radios, each radio including a single microprocessor and a modem and being assigned corresponding radio identification data, a transmission radio frequency, and a corresponding predetermined pattern of tones or digital codes, i.e. a predetermined channel guard. For each radio transmission, the radio microprocessor encodes the radio identification data corresponding to the radio, provides the encoded radio identification data to the radio modem in parallel format, and then generates the predetermined pattern of tones or digital codes corresponding to the radio. The radio modem converts the encoded radio identification data into a serial data stream. The predetermined pattern of tones or digital codes is combined with the serial data stream and simultaneously transmitted over the transmission radio frequency. The radio microprocessor generates the corresponding predetermined pattern of tones or digital codes at the same time the radio modem is converting the encoded identification data into a serial data stream.

When the radio is receiving information, it filters a received signal to separate a received pattern of tones or digital codes from received radio identification data. The filtered radio identification data is converted in the radio modem from a serial data stream into parallel format and stored. The radio microprocessor determines whether the received pattern of tones or digital codes corresponds to the radio's assigned predetermined pattern of tones or digital codes. The radio microprocessor then decodes the stored parallel radio identification data to determine the identification of the transmitting radio. As in the transmission situation, the modem performs the serial to parallel conversion and storage function at the same time that the radio is determining whether the received pattern of tones or digital codes corresponds to the radio's assigned predetermined pattern of tones or digital codes.

The radio communication system in accordance with the present invention finds particular application to LMR mobile radio communication systems which include one or more repeater base stations for receiving and retransmitting radio frequency (rf) communications between plural mobile/portable radios. Each radio includes a memory for storing radio identification data and channel selection information, i.e. ANI and channel guard information. The microprocessor processes the radio identification data retrieved from the memory by spreading each radio identification data bit with a predetermined pattern of chips. Chips are used in the sense that a single ANI bit is represented with a particular binary pattern of chips. The predetermined pattern of chips is based on the data transmission frequency of the modem and the lower frequency of a predetermined (industry standardized) ANI carrier waveform. A binary one is coded using the predetermined pattern of chips, and a binary zero is coded using the complement of the predetermined pattern of chips. In the preferred embodiment of the present invention, the microprocessor further encodes (and decodes) the process radio identification data using differential phase shift keying (DPSK).

The present invention also provides a unique method for generating automatic identification number (ANI) signalling. Each bit of ANI data is represented as a predetermined pattern of chips or as a complement of the predetermined pattern of chips. A modem having a chip transmission frequency greater than the frequency of an ANI carrier waveform is used to repeatedly generate the predetermined pattern of chips and the complement of the predetermined pattern of chips to simulate the ANI carrier waveform.

BRIEF DESCRIPTION OF THE DRAWINGS

Many of the additional advantages and features of the present invention will be more readily apparent and the invention will be better understood by reference to the following detailed description of the invention considered in conjunction with the accompany drawings, of which.

DETAILED DESCRIPTION OF THE DRAWINGS

In the following description, for purposes of explanation and not limitation, specific details are set forth, such as particular circuits and techniques in order to provide a thorough understanding of the present invention. However, it will be apparent to one skilled in the art that the present invention may be practiced in other embodiments that depart from these specific details. In other instances, detailed descriptions of well-known methods, devices and circuits are omitted so as not to obscure the description of the present invention with unnecessary detail.

Figure 1:
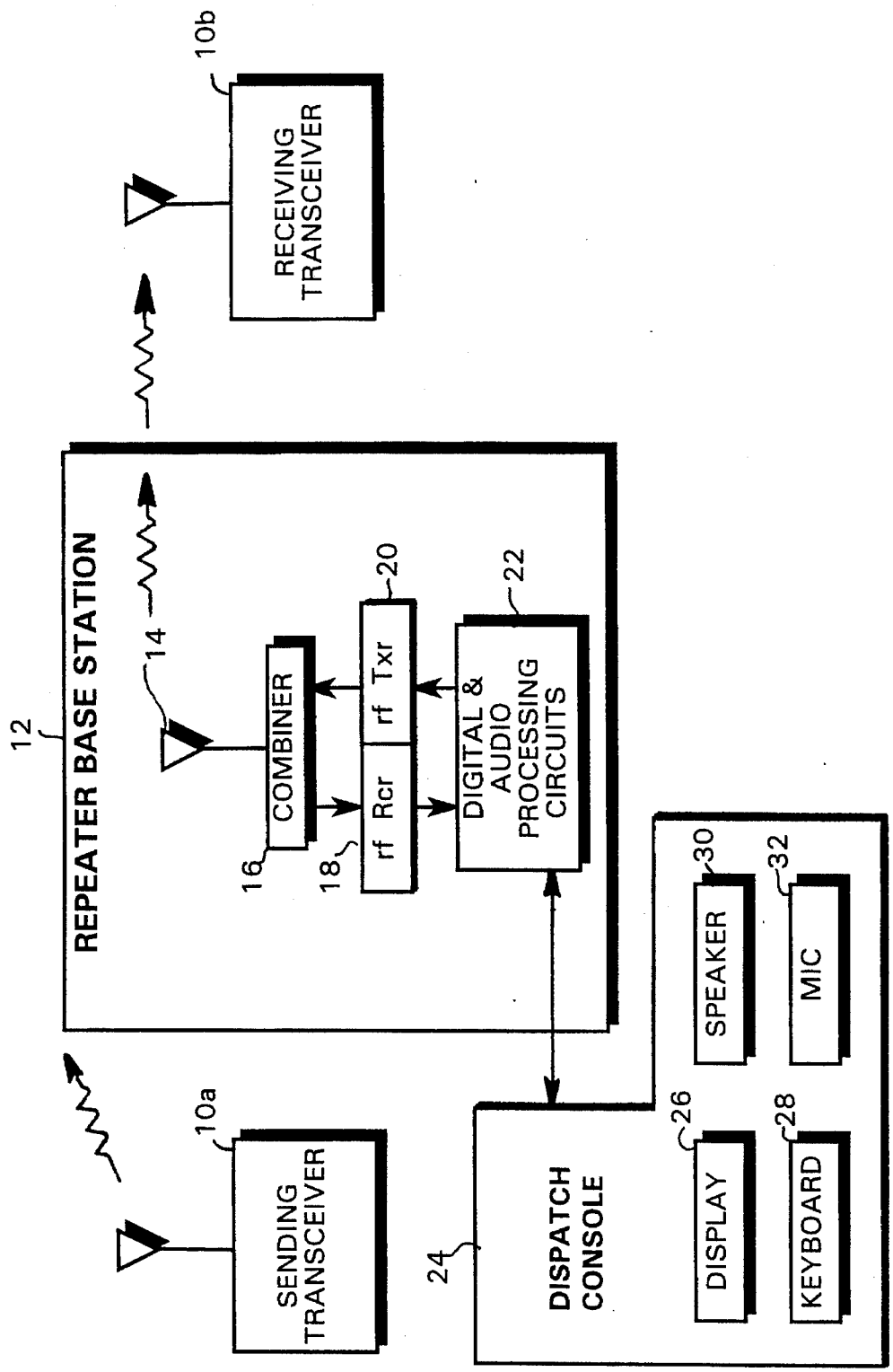
FIG. 1 is a function block diagram of a land mobile radio communications system in which the present invention may be advantageously employed.
Figure 2:
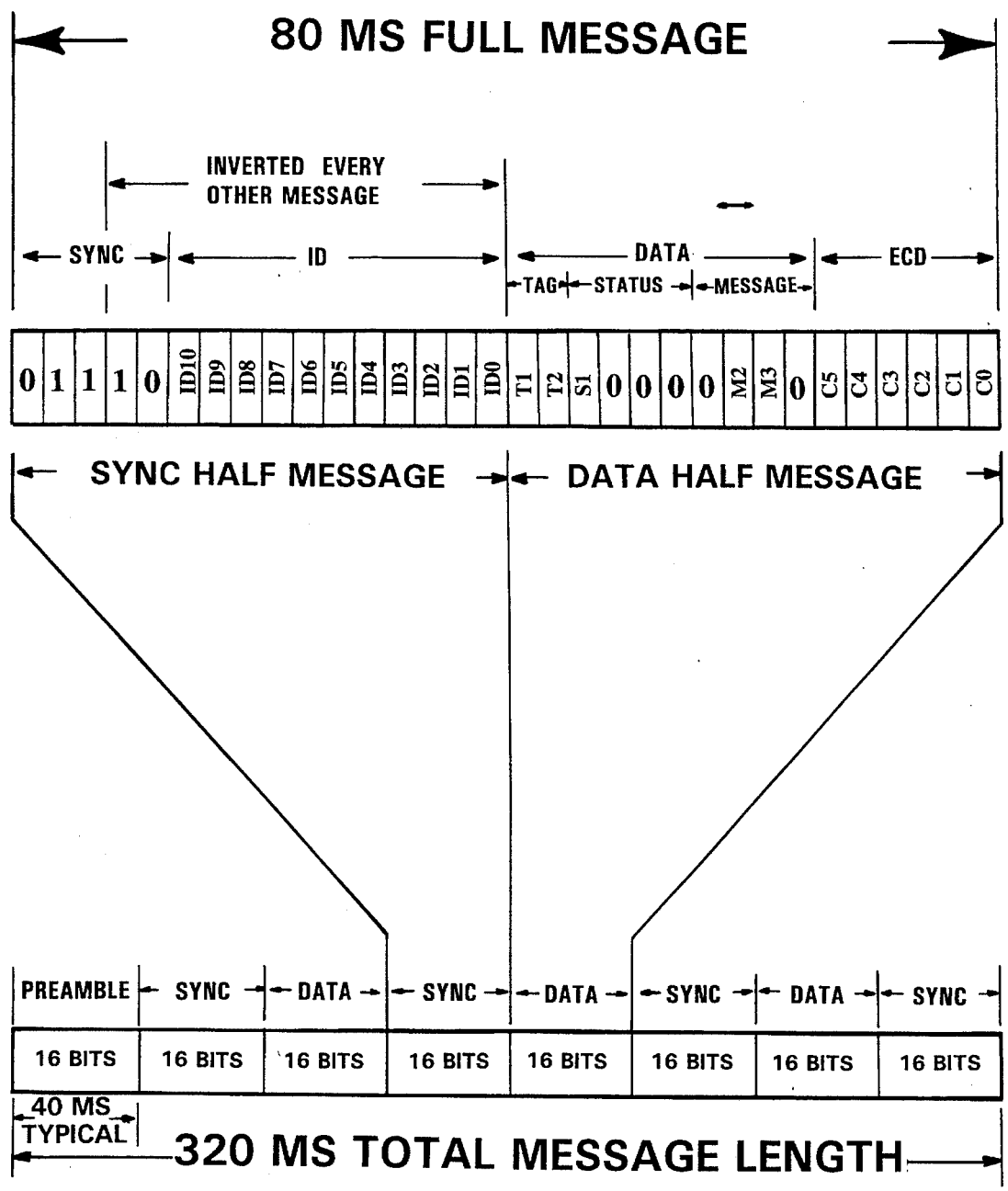
FIG. 2 is a an automatic number identification (ANI) digital signalling format transmitted at least once by each radio unit in a communications system during each radio transmission.

Reference is now made to FIG. 2 for a description of the ANI signalling protocol. Each data burst lasts for 326 milliseconds and is transmitted at 400 bits per second on a 1600 Hz carrier wave. The first sixteen bits (forty milliseconds) of the data bursts are preamble bits which are followed by three redundant messages plus a "half message" used for error correction control codes. Thus, for each data burst there are three distinct opportunities to decode a valid message. Each redundant message is eighty milliseconds long and includes a sync-half message and a data-half message. The sync-half message includes five sync bits and eleven identification (ID) bits. ID0–ID10. The data-half message includes tag, status, and message bits. For example, the message bits M1 and M2 may be set to indicate whether this transmission is an emergency or a normal transmission. Bits C0–C5 correspond to error correction control bits. The eleven ID bits plus two of the sync bits are inverted every other message for error checking purposes. The eleven ID bits (which may be increased if desired by adding tag and status bits to the ID) form the automatic number identification information (ANI) for each radio.

Figure 3:
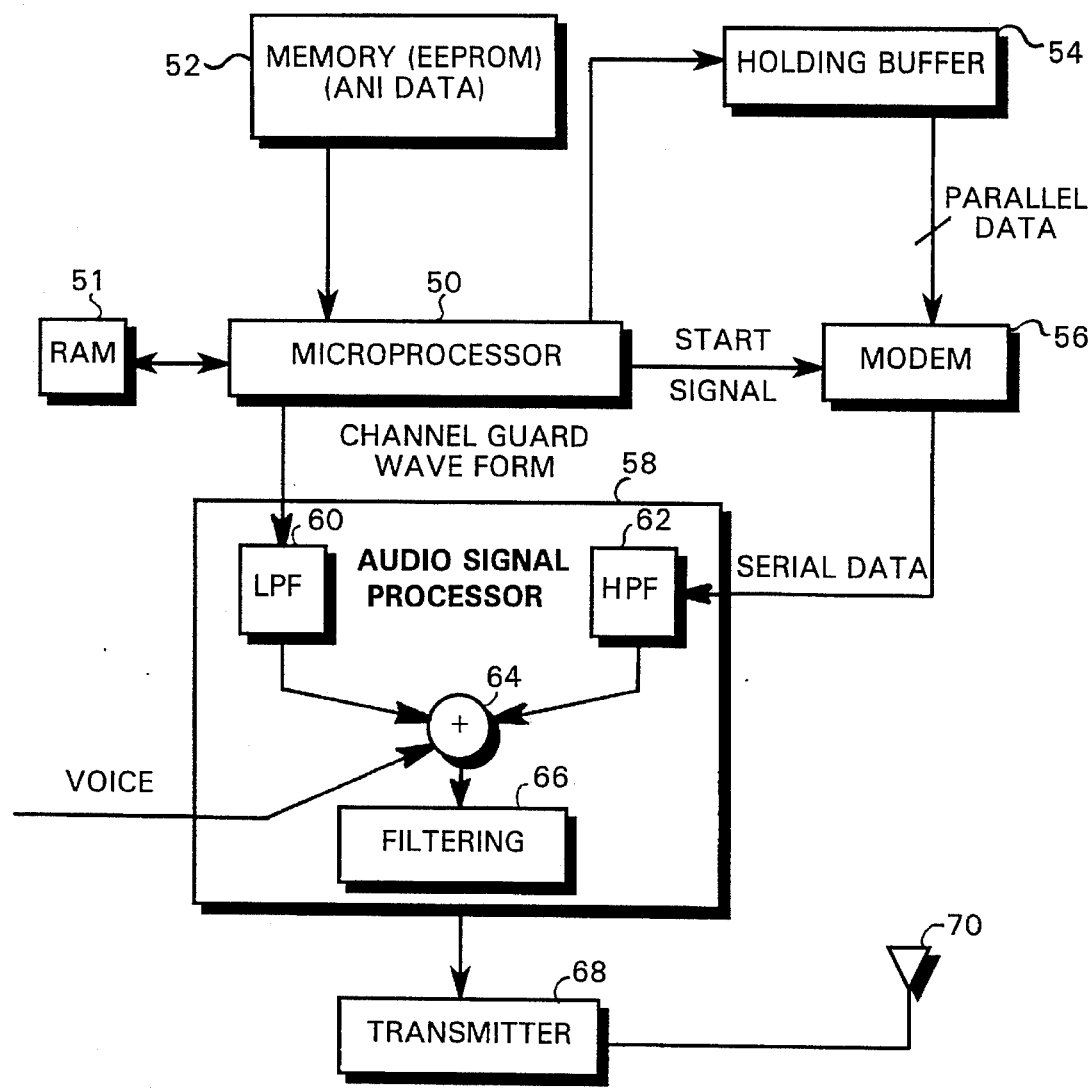
FIG. 3 is a function block diagram of radio unit circuitry for generating and transmitting both channel guard and ANI signals when a user keys his radio in accordance with the present invention.

FIG. 3 is a function block diagram of radio unit circuitry for generating/encoding and transmitting channel guard and ANI signals when a user keys his radio, i.e. presses the push-to-talk (PTT) button. Most modem radio units are manufactured with identical hardware and then are selectively programmed to operate in one or more modes sometimes referred to as "systems." For example, a subscriber may desire a radio that operates in a conventional mode/system as well as a in a trunked mode/system, e.g. single site trunking, multi-site trunking, etc. To accommodate these varying system capabilities, modem radios are outfitted with a standard modem for data communications even though the modem may not actually be activated for use in a conventionally programmed radio. An inexpensive microprocessor 50 uses this existing modem 56 to accomplish the simultaneous generation and reception of ANI and channel guard signals.

More specifically, microprocessor 50 may be for example an 8-bit, relatively inexpensive 8051 microprocessor available from Intel. Because of this microprocessor's relatively slow operating speed, e.g. 11 MHz, and smaller bit processing size (8-bits), the amount of data that can be processed in real time is limited. Accordingly, microprocessor 50 allocates the following tasks to modem 50: (1) converting parallel ANI data into serial format, (2) generating the serial ANI data at the appropriate frequency/data rate while the microprocessor 50 is generating the channel guard signals, (3) receiving the demodulated serial ANI data stream while the microprocessor 50 is detecting channel guard signals, and (4) converting the serial data into parallel format for decoding by the microprocessor 50. Thus, the modem 50 shares in the data processing load so that a second microprocessor is unnecessary.

Each radio includes a memory such as nonvolatile EEPROM 52 for storing the radio's particular "personality". Part of the radio's personality is its ANI data. Whenever the radio operator transmits, that ANI data must also be transmitted. Although the ANI data is often transmitted at the very start of a transmission, i.e. immediately when the PTT button is depressed, the present invention also accommodates transmission of ANI at the end of a communication, periodically throughout the transmission, and/or at the beginning and end of the transmission.

The microprocessor may generate the programmed channel guard pattern (tone or digital code) using conventional techniques. For example, to generate a low frequency channel guard tone pattern (below 211 Hz), the microprocessor may output a series of two bit codes 00, 01, 10, and 11 (three and four bit codes could also be used for greater accuracy) to define one of four voltage levels between 0 and 5 volts. This serial output of voltage levels is used to construct an approximation of a sine wave, e.g. voltage levels at 0, 1.5, 3.25, 5, 3.25, 1.5, 0 volts, etc. The speed at which the microprocessor outputs the two bit codes defines the frequency of the waveform. Passing that waveform through a low pass filter 60 in an audio signal processor 58 results in a smoothed sinusoidal waveform (or tone) at the programmed channel guard frequency.

Assuming for purposes of description that the ANI data is to be generated immediately upon depression of the PTT button, the microprocessor 50 immediately retrieves the radio's ANI data from EEPROM memory 52 and outputs 384 bytes of encoded ANI data to a holding buffer 54, (the encoding process is described below). Although buffer 54 is shown separately, it may for example correspond to a particular area of the radio RAM 51. Once buffer 54 is loaded, the microprocessor 50 starts to generate the channel guard waveform as described above at the programmed channel guard frequency. As the channel guard signalling commences, the microprocessor sends a start signal to modem 56 which in response reads parallel bytes of encoded ANI data from holding buffer 54 and converts it into serial format. The encoded serial bit stream is provided to the audio signal processor 58 and filtered in high pass filter 62 which removes noise spikes in the ANI data.

The filtered channel guard and encoded ANI signals are combined at summer 64 (with audio/voice if present) and passed through a final filtering stage 66 before being passed to conventional transmitter 68. Transmitter 68 includes a frequency synthesizer for generating a carrier at a preassigned radio frequency. The composite information signal output by the audio signal processor 58 modulates the carrier, and the modulated carrier is transmitted via antenna 70.

Figure 4:
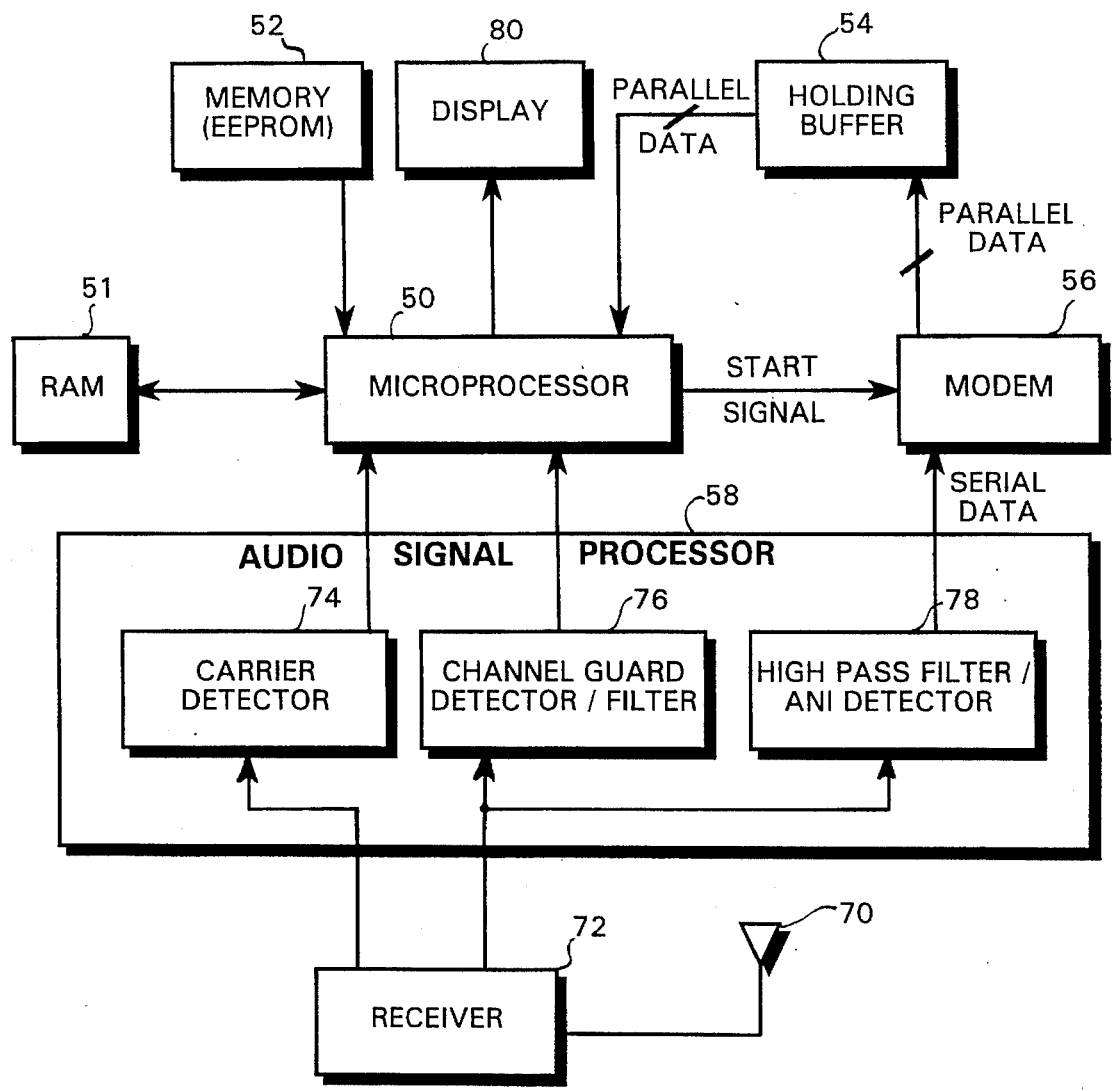
FIG. 4 is a function block diagram of radio unit circuitry for receiving and decoding channel guard and ANI signals in accordance with the present invention.

FIG. 4 is a function block diagram of radio circuitry for receiving and detecting/decoding channel guard and ANI signals in accordance with the present invention. Since some of the hardware described in conjunction with FIG. 3 is also used for reception, like reference numerals are used for consistency. A conventional receiver 72 is tuned to detect and receive from antenna 70 signals on a predetermined radio frequency. Conventional carrier detector 74 detects the presence of a carrier (as opposed to noise). Microprocessor 50 activates the modem 56 in preparation for receiving ANI information based on the detection of a carrier.

After demodulation of the received signal to remove the carrier, the demodulated information is low pass filtered in channel guard detector 76 to pass only frequencies below for example 220 Hz. The channel guard sinusoidal tone is converted in the usual manner via comparator into a square wave pulse train which is then sent to microprocessor 50. The microprocessor 50 decodes a predetermined tone pattern (or digital code pattern), and if the decoded channel guard pattern corresponds to the programmed channel guard pattern, the microprocessor closes the audio signal paths (not shown) in the audio signal processor to unmute the audio. Reference is made to commonly assigned U.S. Pat. No. 5,046,126 for a description of exemplary circuitry for detecting carrier and channel guard signals.

The audio signals are also filtered in high pass filter/ANI detector 78 which passes information in the audio range of frequencies including the ANI signals which are transmitted on a 1600 Hz carrier but not the low frequency channel guard data. Similar to the technique used in channel guard detector 76, the high passed filtered signals are processed by the ANI detector which includes a comparator that converts the ANI signals into a square wave of digital "1's" and "0's". The digital data is serially transmitted to modem 56 which converts the serial bit stream into 8-bit bytes of parallel data and then stores that parallel data in the holding buffer 54. 400 bytes of parallel ANI data are stored in holding buffer 54 to insure that the ANI data is completely received. The microprocessor 50 then retrieves the ANI data for decoding (described further below) and display on display 80 of the transmitting radio's ID and indication of any emergency message.

Figure 5:
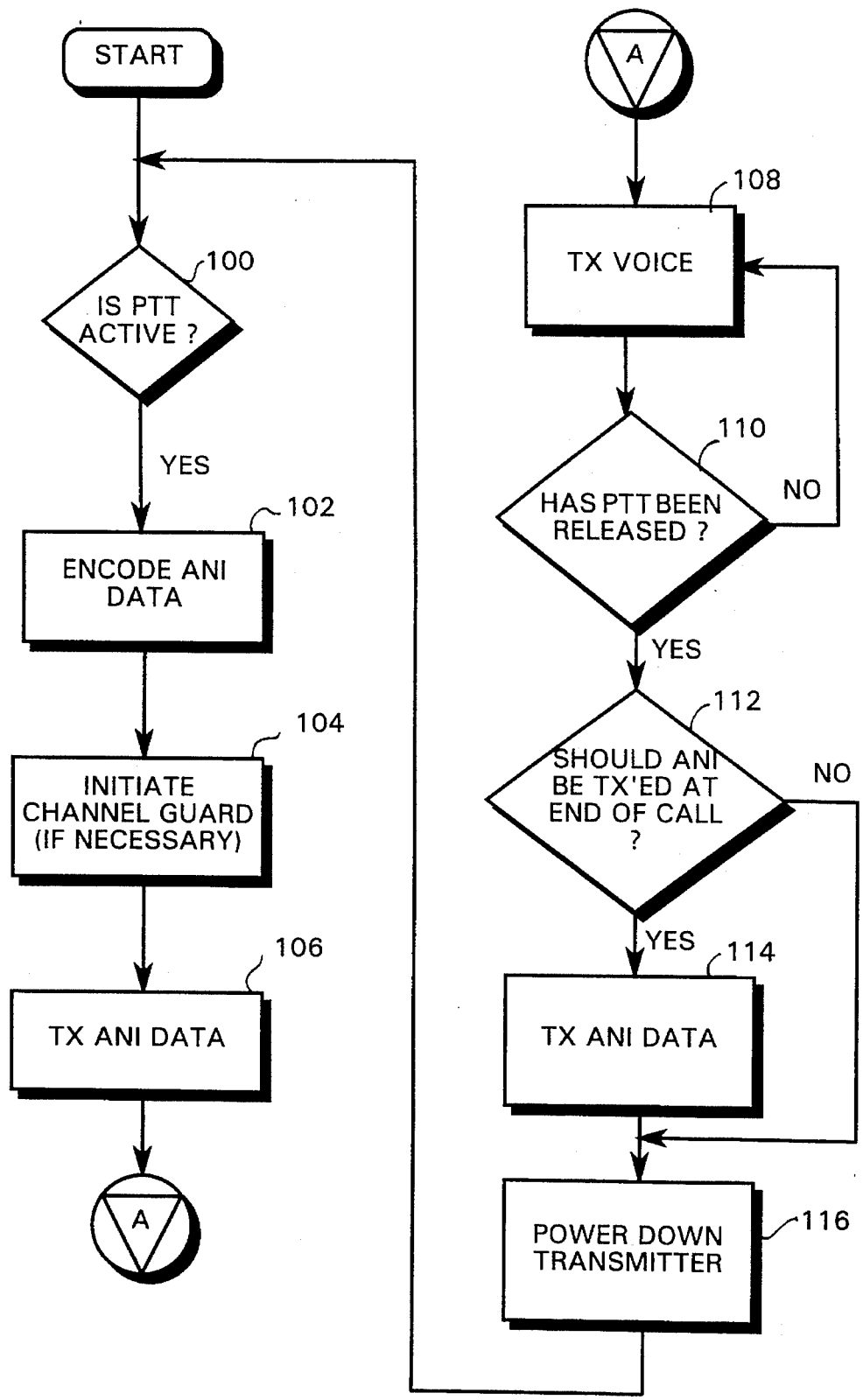
FIG. 5 is a flow chart outlining the data processing steps followed by a radio unit microprocessor to accomplish generation/encoding and transmission of channel guard and ANI signals.

The overall operation of the radio in a transmit mode is described now in conjunction with the flow chart in FIG. 5. The radio maintains a "receive loop" at decision block 100 to detect a depressed PTT button indicating the start of a transmission. Once an active PTT is detected, the radio's ANI data are retrieved from EEPROM 52 and encoded (as described in detail below) by the microprocessor 50 in block 102. Thereafter, the programmed channel guard waveform is generated by the microprocessor 50 for transmission (block 104). Of course, there may be instances where a radio is not programmed for channel guard and in those instances this step is unnecessary. The microprocessor 50 then loads the holding buffer 54 with the encoded ANI data and initiates transmission of the encoded ANI data using modem 56 in block 106. The radio is then ready to transmit the voice message in block 108, whereafter the radio enters another loop to detect when the PTT is released in block 110. After PTT release, a determination is made whether the operator has programmed the radio to transmit ANI data at the end of each call (block 112). If so, the ANI data is again transmitted in block 114. Thereafter, the radio powers down its transmitter and returns to the PTT activity loop (block 114).

Figure 6:
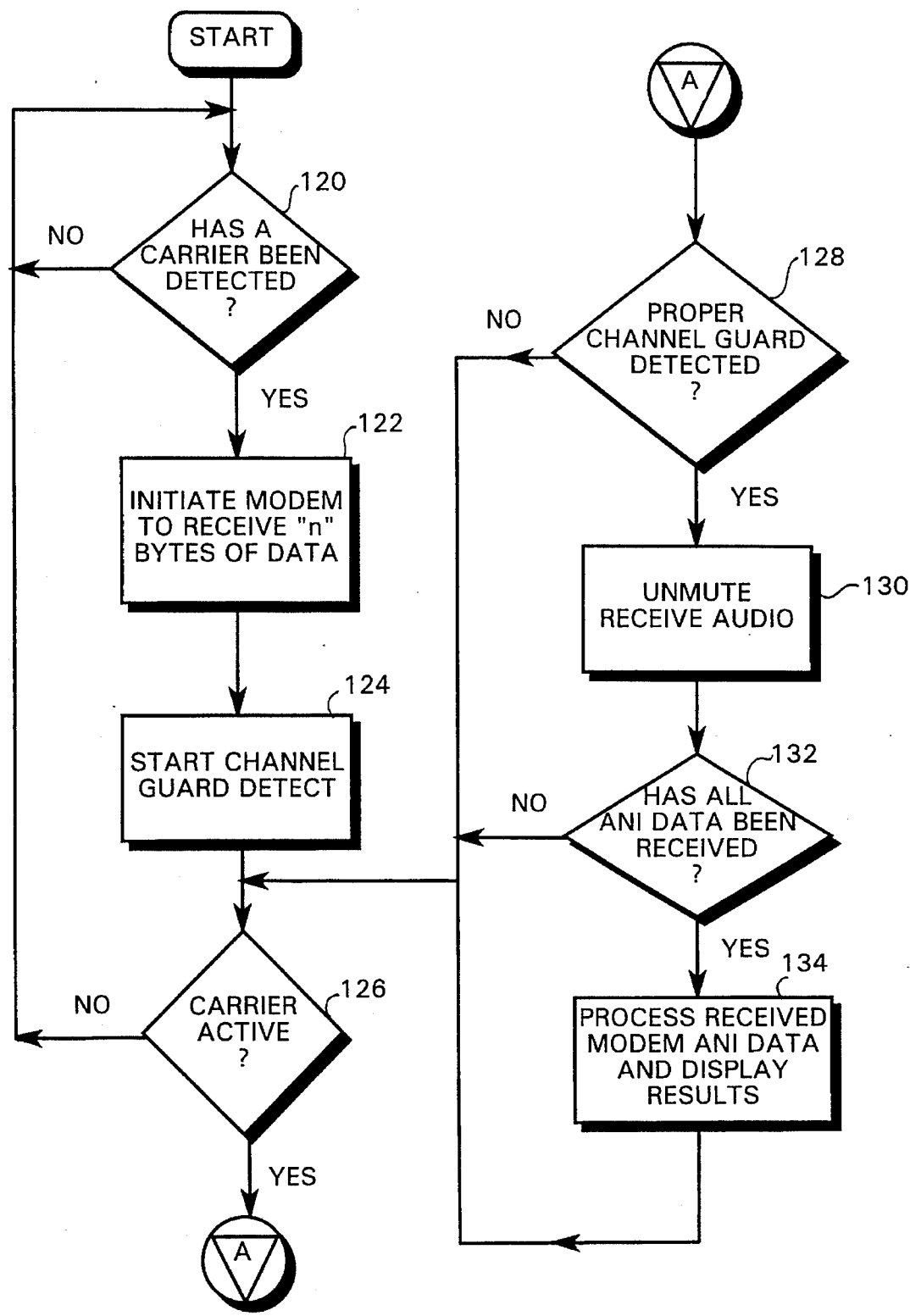
FIG. 6 is a flow chart outlining the data processing steps followed by a radio unit microprocessor to accomplish reception/decoding of channel guard and ANI information.

The overall operation of the radio in a receive mode is described now in conjunction with the flow chart in FIG. 6. The radio microprocessor 50 maintains a carrier detection loop in block 120. Once a carrier on the programmed rf frequency is detected, the microprocessor 50 sends a start signal to the modem 56 in preparation for receipt of a preset number "n" of data bytes (block 122). As described above, "n" could be 400. The microprocessor 50 then begins channel guard detection in block 124 and checks again to insure that the carrier is still present in block 126. In decision block 128, the microprocessor 50 determines whether the programmed channel guard pattern is being received. If not, control proceeds to the carrier activity decision block 126. If the proper channel guard is detected, the receive audio is unmuted in block 128. A determination is then made in block 130 whether all of the ANI data has been serial-to-parallel converted by the modem 56 and stored in holding buffer 54. If so, control proceeds to block 132 where the ANI data from the holding buffer 54 is retrieved and decoded by the microprocessor 50 for display. Otherwise, control returns to the carrier activity determination block 126.

Conventional encoding and decoding of the ANI data are performed by the microprocessor 50. The preferred coding technique is differential phase shift keying DPSK. In basic phase shift keying (PSK), a "1" is phase-shifted by +90 degrees and a "0" is phase-shifted by −90 degrees so "1's" and "0's" are 180 degrees out of phase. A drawback with this technique is that the PSK waveform may be inverted during transmission over a channel and/or reception resulting in complementing of the data. To ameliorate this problem, differential coding is employed. Encoded differential data are generated by $$e_n = d_n \oplus e_{n-1}$$

where $\oplus$ is a modulo-2 adder or exclusive OR gate (XOR) operation. The received data are decoded by $$\tilde{d}_n = \tilde{e}_n \oplus \tilde{e}_{n-1}$$

where the tilde denotes receiving end data.

Each bit is encoded by comparing the present input bit with the past encoded bit. A binary 1 is encoded if the present input bit and the past encoded bit are of opposite binary state. A binary 0 is encoded if the states are the same. At the receiver, the encoded signal is decoded by comparing the state of adjacent bits. If the present received encoded bit has the same state as the past encoded bit, a binary 0 is the decoded output. A binary 1 is decoded if the states are opposite.

Figure 7A:
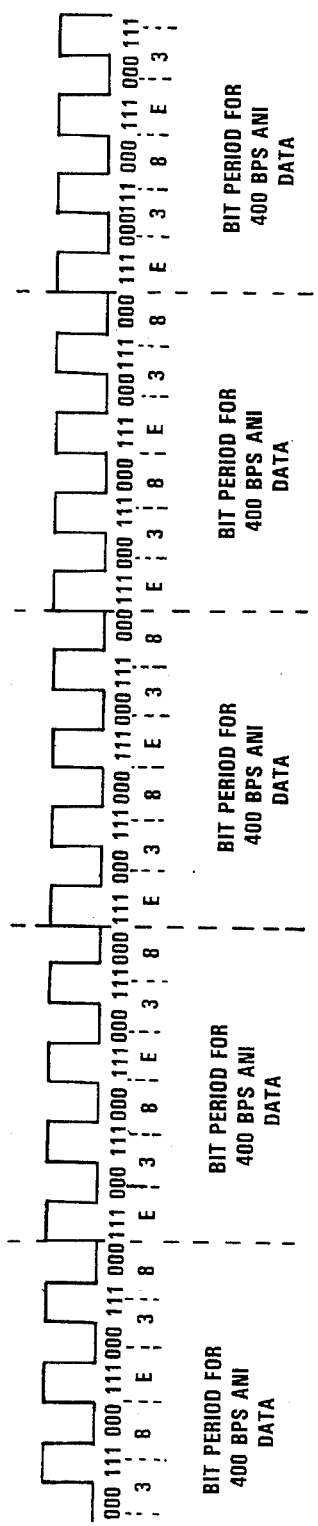
FIGS. 7(a) and 7(b) are binary waveforms illustrating the manner in which ANI information is encoded in accordance with the present invention.
Figure 7B:
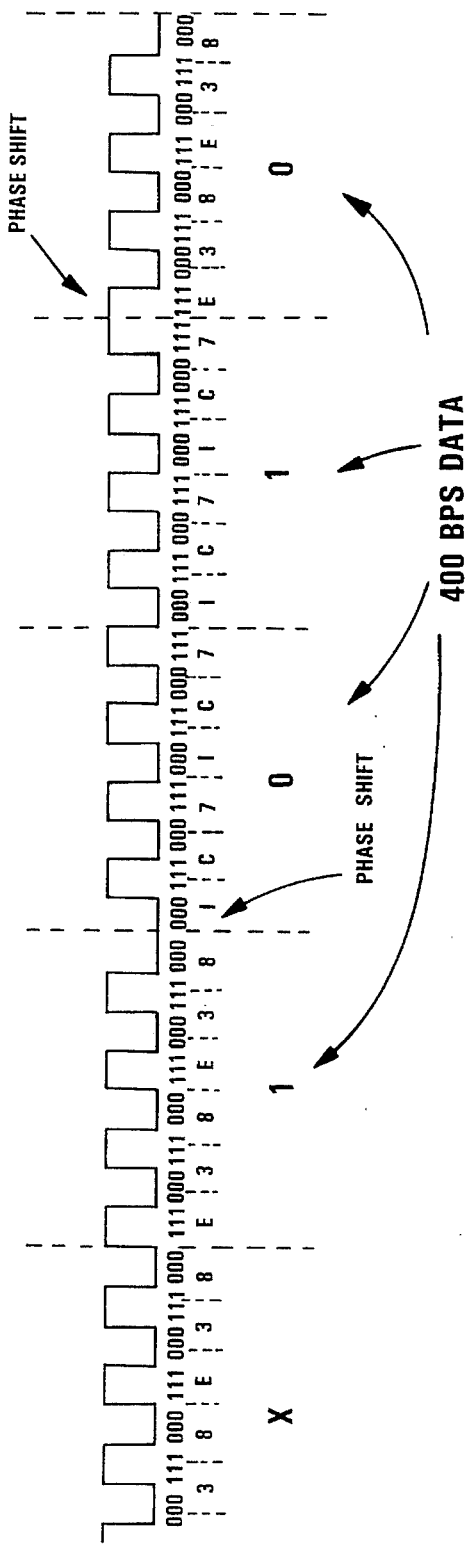

The manner in which the ANI carrier waveform is created and modulated with DPSK encoded ANI data is now described in conjunction with FIGS. 7(*a*) and 7(*b*). The ANI data are by industry convention and specification to be transmitted at 400 bits per second (bps) on a 1600 Hz carrier. The modem 56 typically operates at a preset baud rate, e.g. 9600 baud. Assuming a 9600 baud rate for purposes of illustration, the modem 56 effectively operates at a frequency of 4800 Hz. Consequently, the modem frequency is three times faster than the 1600 Hz ANI carrier. Since the number of ANI binary symbols to be produced per second is less than the number of binary symbols actually generated per second by the modem, the term "chip" is hereafter adopted to define a single binary symbol generated by the modem at 9600 baud, and the term "bit" is hereafter adopted to define each binary symbol of ANI data to be transmitted at the standard 400 bps rate.

Despite the difference in the frequency/data rate, microprocessor 50 synthesizes the 1600 Hz ANI carrier by cyclically repeating a specific chip pattern for the modem to generate. Referring now to FIG. 7(*a*), a square wave ANI carrier is created using a particular chip pattern for subsequent output by the modem at 4800 Hz (9600 baud). Specifically, the ANI carrier frequency is synthesized using a 24-chip pattern of E 3 8 E 3 8 in hexadecimal notation. Four of the square wave cycles correspond to one ANI bit period at 9600 baud. Accordingly, the 24-chip pattern E 3 8 E 3 8 (or its complement as described below) is generated for each ANI data bit.

FIG. 7(*b*) shows an example of how four bits of ANI data, i.e. 1010, are encoded by the microprocessor 50. A binary one ANI bit is PSK encoded as chip pattern E 3 8 E 3 8; a binary 0 bit is PSK encoded as the complement of chip pattern E 3 8 E 3 8 or 1 C 7 1 C 7 in hexadecimal notation. The first ANI bit period is arbitrary selected as a binary 1 bit as a reference for the subsequent ANI message bits. Using this technique, since an ANI "1" chip pattern is the complement of an ANI "0" chip pattern, an ANI "1" chip pattern is 180 degrees out of phase with an ANI "0" chip pattern. In this way, phase shift keying is readily accomplished with modem 56.

Figure 8:
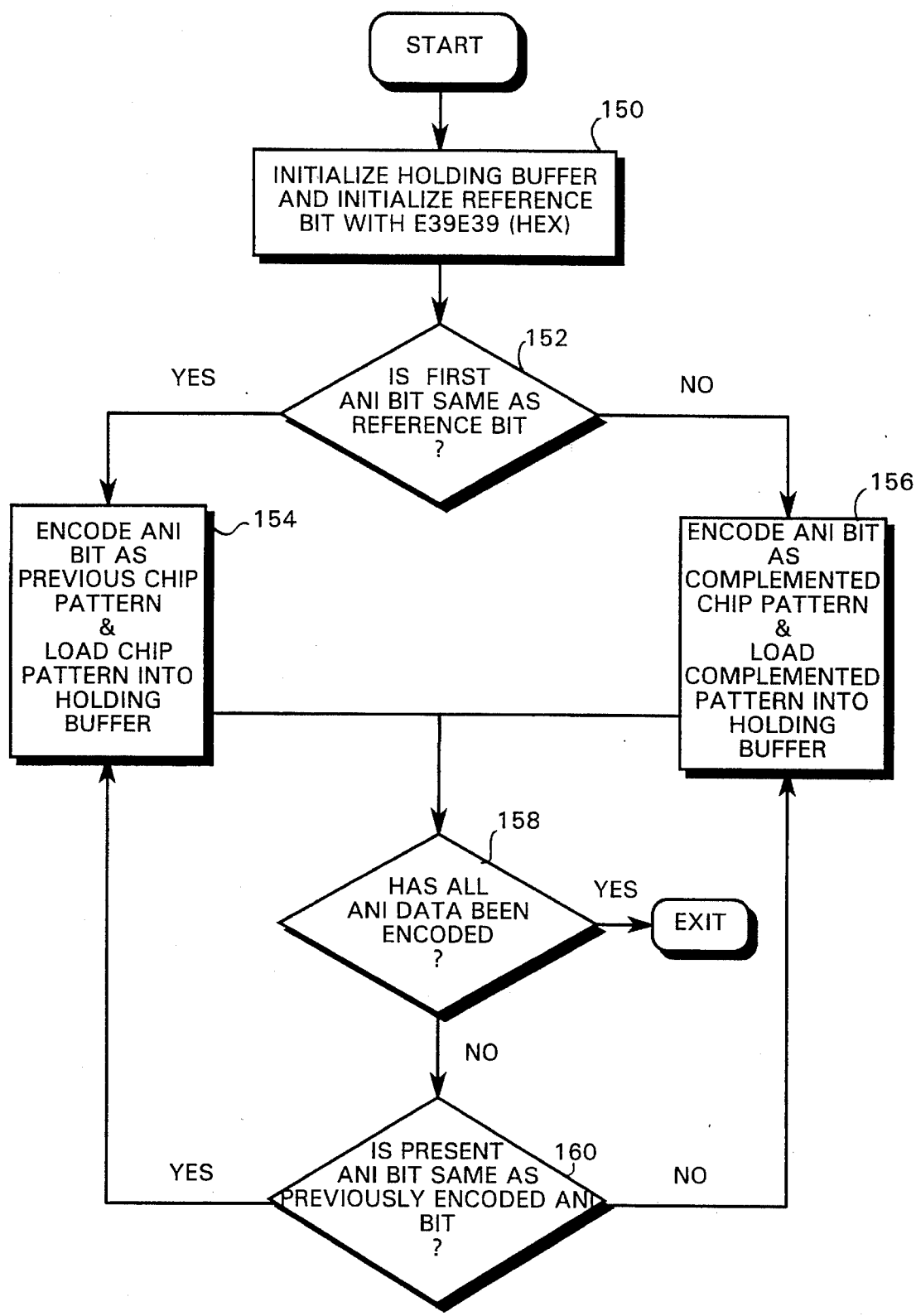
FIG. 8 is a flow chart outlining the data processing steps followed by a radio unit microprocessor to differentially phase shift key encode ANI data bits for transmission.

The method by which the ANI data are differentially PSK encoded is now described in conjunction with FIG. 8. The microprocessor 50 initializes holding buffer 54 and sets the first ANI reference bit to E39E39(HEX) in block 150. A determination is made in block 152 whether the first processed bit of ANI data is the same as the reference bit. If so, that ANI bit is encoded as the previously encoded chip pattern and loaded into the holding buffer 54 (block 154). If the ANI data bit is different from the reference bit, the microprocessor encodes the ANI bit as the complement of the previously encoded chip pattern and loads that complement chip pattern into the holding buffer 54 (block 156). After each ANI bit is DPSK encoded with an appropriate 24-chip pattern, a determination is made whether all of the ANI data bits have been encoded (block 158). If so, the routine ends. If not, another determination is made whether the current bit to be encoded is the same as the previously encoded ANI bit (block 160). If so, the previously encoded chip pattern is encoded and loaded (block 154). If the bits are different, the complement chip pattern is encoded and loaded (block 156).

Figure 9:
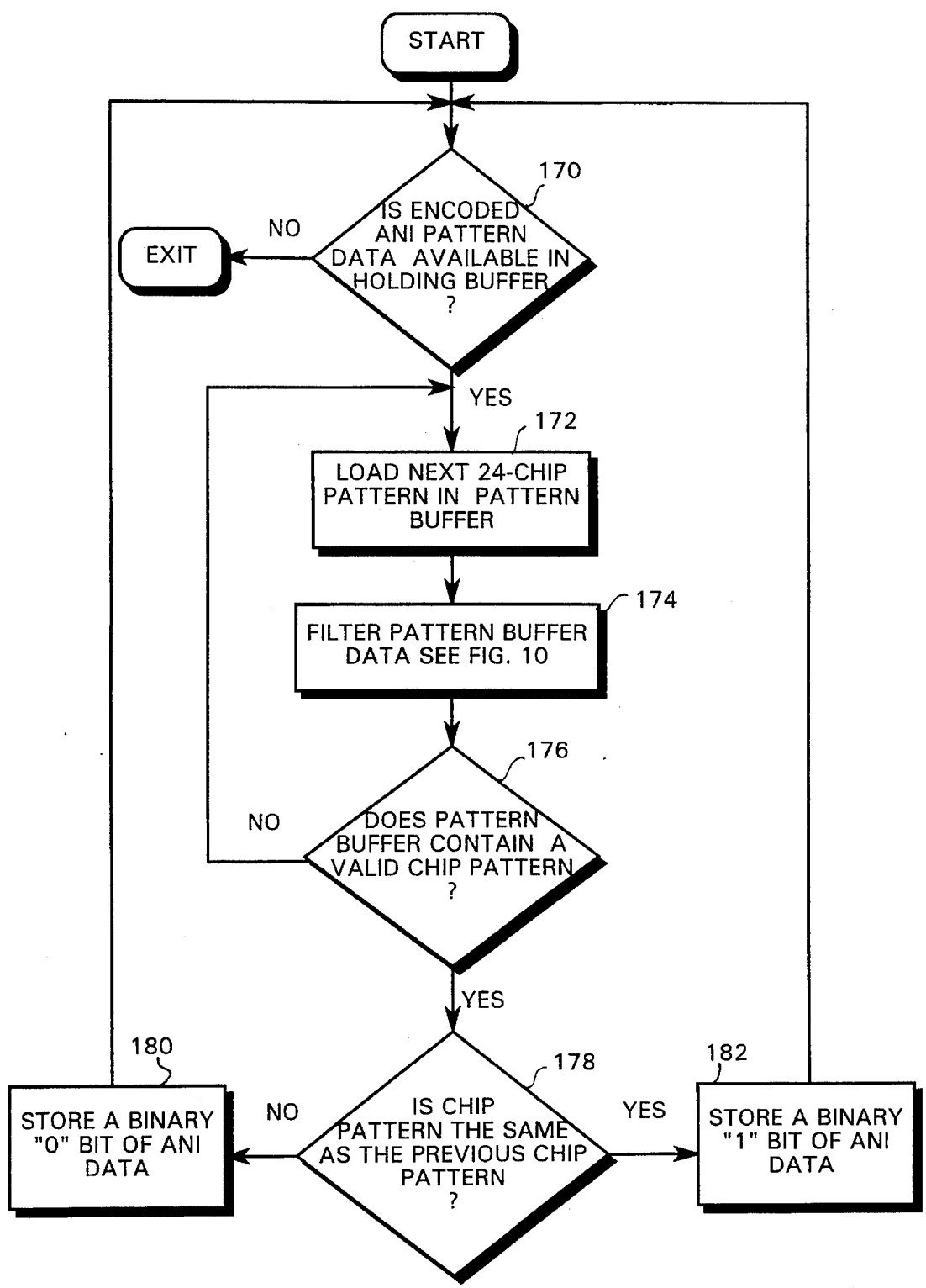
FIG. 9 is a flow chart outlining the data processing steps followed by a radio unit microprocessor to differentially phase shift key decode ANI data upon reception.

The DPSK decoding procedure in accordance with the present invention is now described in conjunction with FIG. 9. An initial determination is made whether there is any ANI encoded pattern data available in the holding buffer 54 (block 170). If not, the routine exits. If there is available pattern data, the microprocessor 50 retrieves from holding buffer 54 the next 24-chip pattern and loads it into a pattern buffer (not shown) which may for example be an internal groups of registers or alternatively a portion of the radio's RAM (block 172).

Figure 10:
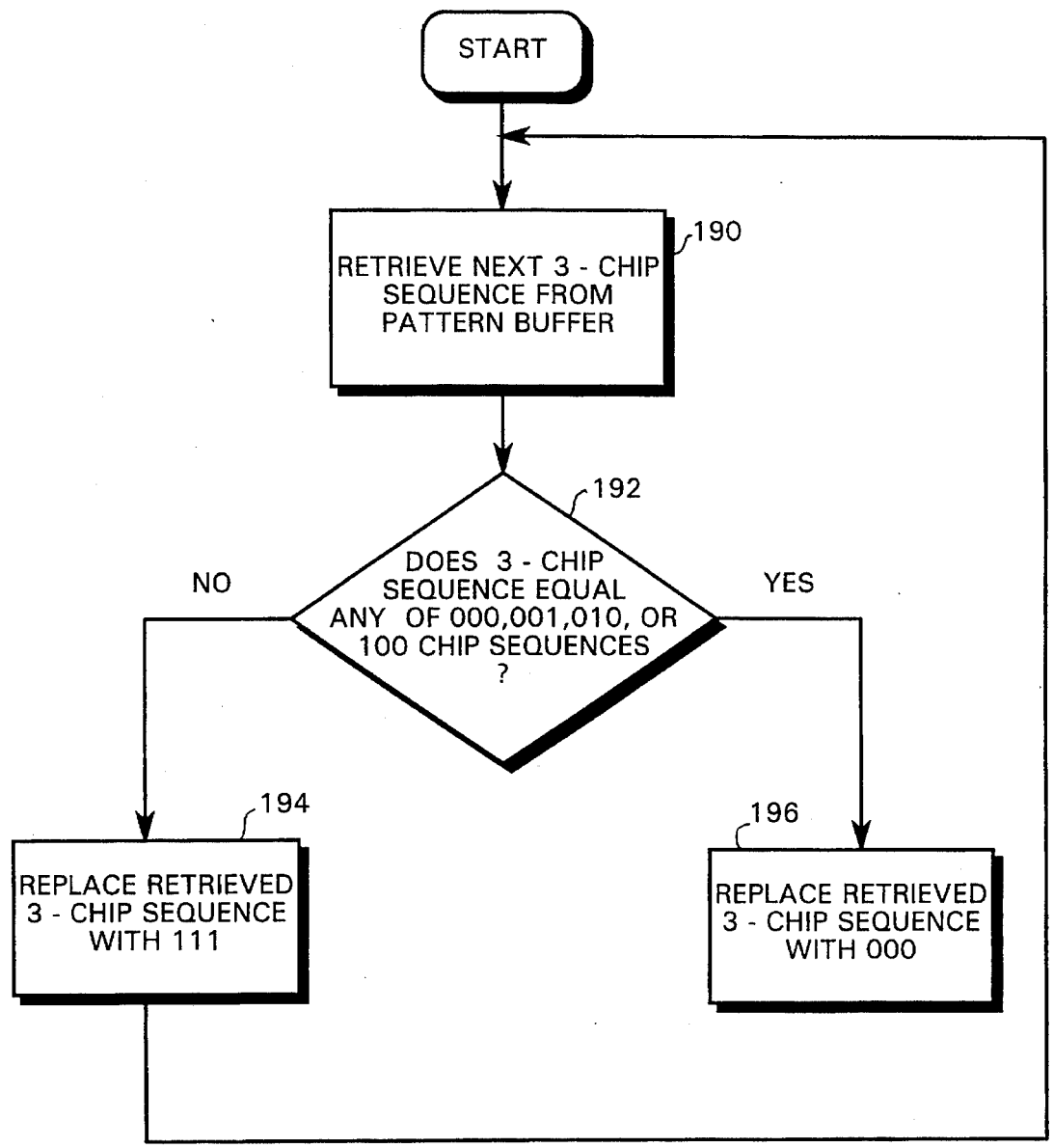
FIG. 10 is a flow chart illustrating data processing steps filtering pattern buffer data referred to in FIG. 9.

To minimize the effects of noise, the 24 chips stored in the pattern buffer are filtered (block 174) in accordance with the filter pattern buffer routine described now in conjunction with FIG. 10. A retrieved 24 chip pattern is divided into three chip sequences (block 190). Each set of three chips is compared with 000, 001, 010, or 100 (block 192). If the 3-chip sequence corresponds to one these four sequences then it is replaced with a 000 chip sequence (block 196). If the 3-chip sequence does not correspond to one of the four compared sequences, it is replaced with a 111 chip sequence (block 194). This filtering technique ensures a bit pattern corresponding to the waveform format shown in FIG. 7(a), i.e. sequences of 111 and 000, is produced. These three chip sequence comparisons correct for noise in the system by performing a two out of three vote on received chip sequences. If two or more chips in a three chip sequence are zeroes, then the whole pattern is defined as a 000 sequence. If two or more chips in a three chip sequence are ones, then the whole pattern is defined as a 111 sequence. The two out of three vote essentially averages the received three chip sequence to determine the most likely correct pattern effectively filtering out random gaussian white noise present in the communications channel. Of course, more sophisticated noise filtering algorithms could also be employed.

Returning to FIG. 9, the filtered pattern buffer chip data is compared to valid chip patterns E 3 8 E 3 8 or 1 C 7 1 C 7 (block 176). If the chip pattern is valid, a determination is made whether the chip pattern is the same as the previous pattern (block 178). If so, a binary "1" bit of ANI data is stored (block 182). If the chip pattern is different, a binary "0" bit of ANI data is stored (block 180). In this way, the microprocessor DPSK decodes all of the chip patterns stored in the holding buffer 54.

Thus, by using the modem 56 to parallel to serial convert and transmit the coded ANI data and serial to parallel convert and receive the coded ANI data, the single microprocessor 50 is relieved of these time consuming processing tasks. That permits a relatively slow and inexpensive microprocessor to handle both the channel guard generation/ detection tasks as well as the ANI generation/detection tasks without a second microprocessor.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a radio communications system including plural radios, each radio including a microprocessor and a modem and being assigned corresponding radio identification data, a transmission radio frequency, and a corresponding predetermined pattern of tones or digital codes, a method for transmitting information from a radio over the transmission radio frequency, comprising:

encoding the radio identification data corresponding to the radio;

providing the encoded radio identification data to the radio modem in parallel format;

generating the predetermined pattern of tones or digital codes corresponding to the radio;

converting the encoded radio identification data into a serial data stream in the radio modem;

combining the predetermined pattern of tones or digital codes with the serial data stream into a combined signal; and simultaneously transmitting the combined signal over the transmission radio frequency.

2. The method of claim 1, wherein the radio microprocessor generates the corresponding predetermined pattern of tones or digital codes at substantially the same time the radio modem is converting the encoded identification data into a serial data stream.

3. In a radio communications system including plural radios, each radio including a microprocessor and a modem and being assigned corresponding radio identification data and a predetermined pattern of tones or digital codes, a method of receiving information at a receiving radio comprising:

filtering a received signal to separate a received pattern of tones or digital codes from received radio identification data;

converting the filtered radio identification data in the radio modem from a serial data stream into parallel format and storing the parallel radio identification data;

determining in the radio microprocessor whether the received pattern of tones or digital codes corresponds to the radio's assigned predetermined pattern of tones or digital codes; and decoding in the radio microprocessor the stored parallel radio identification data.

4. The method of claim 3, wherein the converting step and the determining step occur at the same time.

5. A radio system comprising:

a repeater base station for receiving and retransmitting radio frequency (rf) communications between plural mobile/portable radios, each radio including:

a memory for storing radio identification data and channel selection information;

a microprocessor for processing the radio identification data retrieved from the memory and generating a predetermined pattern of tones or digital codes based on the channel selection information; and a modem for converting the processed radio identification data into a serial data stream, wherein the predetermined pattern of tones or digital codes generated by the microprocessor and the serial data stream generated by the modem are combined into a combined signal which modulates an rf carrier.

6. The system in claim 5, wherein the modem converts the processed radio identification data at the same time the microprocessor generates the predetermined pattern of tones or digital codes.

7. The system as in claim 5, wherein the microprocessor processes the radio identification data by spreading each radio identification data bit with a predetermined pattern of chips.

8. The system as in claim 6, wherein the predetermined pattern of chips is based on the data transmission frequency of the modem.

9. The system in claim 8, wherein repetitive cycling of predetermined pattern of chips generates a waveform at a frequency lower than the data transmission frequency of the modem.

10. The system in claim 8, wherein repetitive cycling of the predetermined pattern of chips and a complement of the predetermined pattern of chips generates a waveform at a frequency lower than the data transmission frequency of the modem.

11. The system in claim 10, wherein the lower frequency corresponds to 1600 Hz.

12. The system in claim 10, wherein a binary "1" is coded using the predetermined pattern of chips and a binary "0" is coded using the complement of the predetermined pattern of chips.

13. The system as in claim 12, wherein the microprocessor encodes the processed radio identification data using differential phase shift keying (DPSK).

14. The system as in claim 5, wherein each radio further includes:
   means for receiving and demodulating the a received radio frequency carrier transmission to obtain a demodulated signal;
   means for detecting a received pattern of tones or digital codes and received serial radio identification data from the demodulated signal, wherein the radio modem converts the detected serial radio identification data into parallel format and the radio microprocessor processes the detected pattern of tones or digital codes.

15. The system as in claim 14, wherein the modem stores the parallel radio identification data in a buffer and the microprocessor retrieves and processes the buffered data to determine the identification number of a transmitting radio.

16. The system as in claim 14, wherein the microprocessor processes buffered data to interpret a predetermined binary pattern as a first radio identification data value and a complement of the predetermined binary pattern as a second radio identification data value.

17. The system as in claim 16, wherein the microprocessor decodes the interpreted radio identification data values using differential phase shift keying decoding.

18. The system as in claim 14, wherein the microprocessor compares the detected pattern of tones or digital codes with the channel selection information stored in the radio's memory at the same time the modem converts the detected serial radio identification data into parallel format.

19. The system as in claim 14, wherein the detected radio identification information includes whether the transmission is an emergency.

20. The system as in claim 5, wherein the radio identification data is transmitted whenever the radio is activated to start a communication.

21. The system as in claim 5, wherein the radio identification information is transmitted whenever the radio is activated to start a communication or deactivated to end a communication.

* * * * *